Aug. 28, 1945.  E. P. KINNE  2,383,656
DRAFT GEAR
Filed Sept. 21, 1942  5 Sheets-Sheet 1

INVENTOR.
Edmund P. Kinne
BY
Atty.

Aug. 28, 1945. E. P. KINNE 2,383,656
DRAFT GEAR
Filed Sept. 21, 1942   5 Sheets-Sheet 2

INVENTOR.
Edmund P. Kinne
BY
Atty.

Aug. 28, 1945.  E. P. KINNE  2,383,656
DRAFT GEAR
Filed Sept. 21, 1942  5 Sheets-Sheet 3
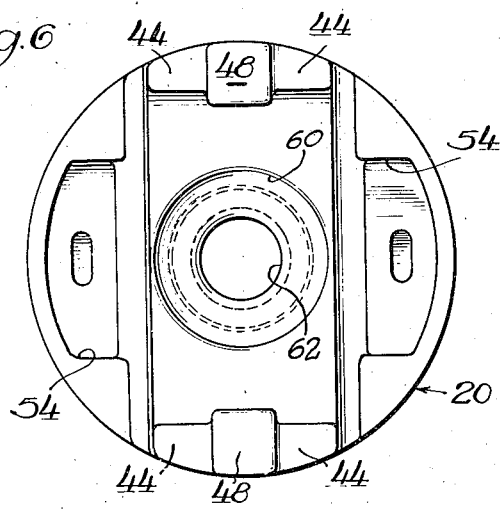
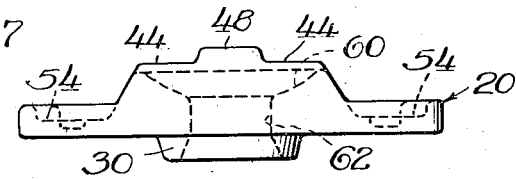
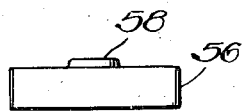
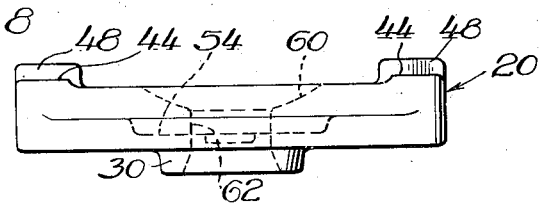
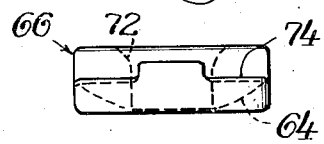
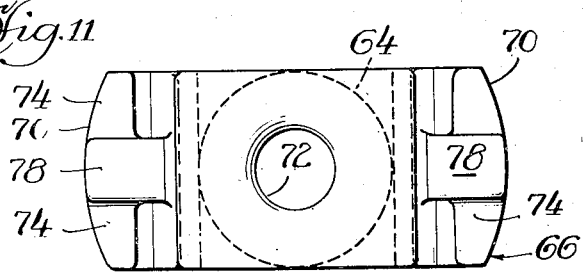
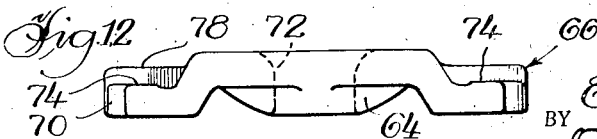
INVENTOR.
Edmund P. Kinne
BY
Atty.

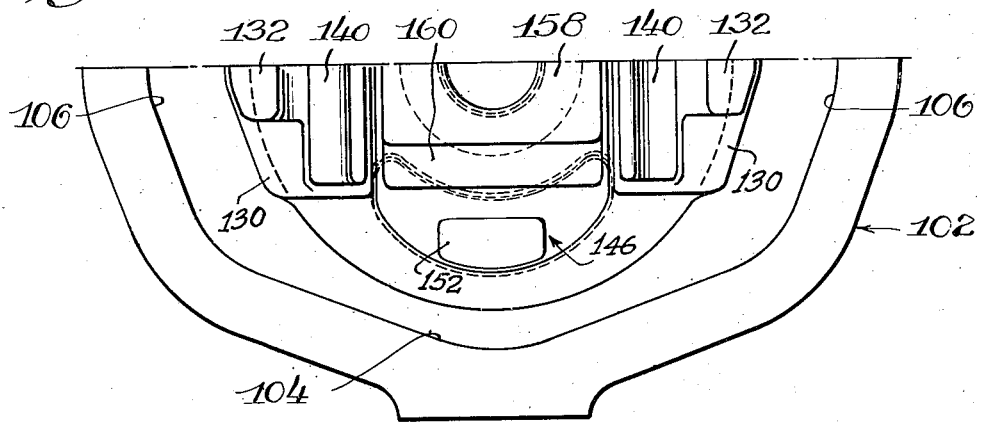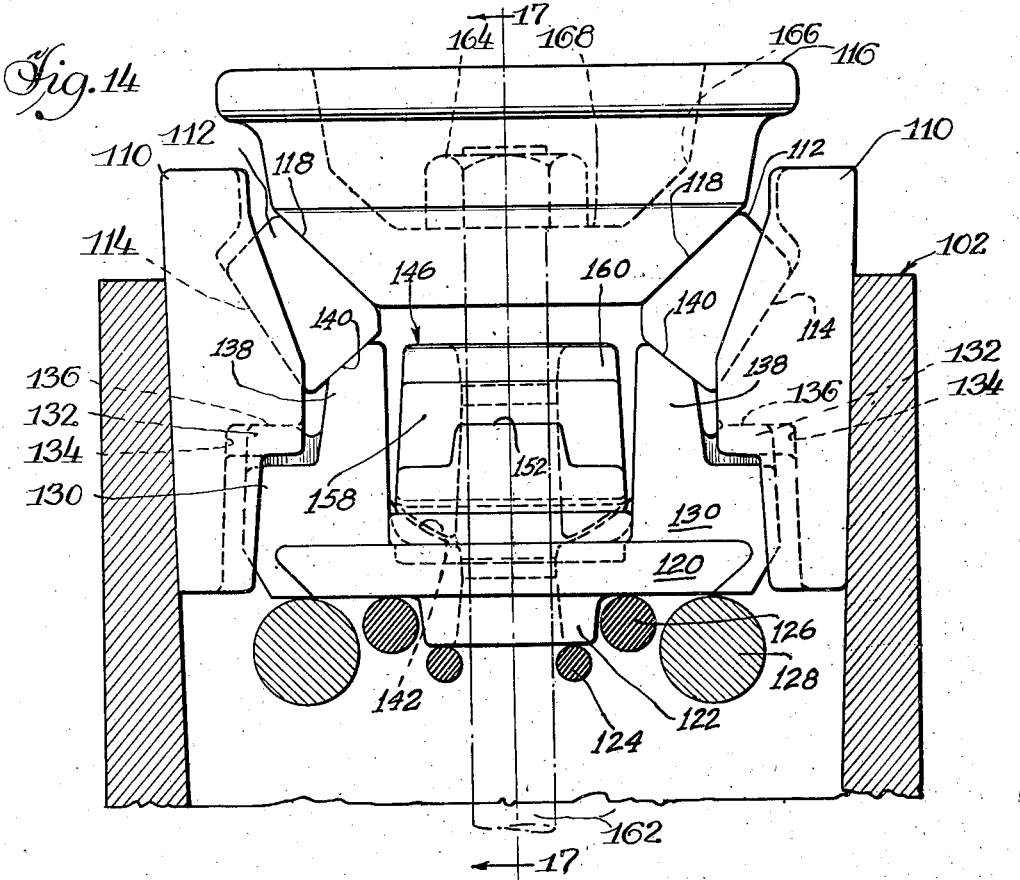

Patented Aug. 28, 1945

2,383,656

UNITED STATES PATENT OFFICE 2,383,656

DRAFT GEAR

Edmund P. Kinne, Alliance, Ohio, assignor to American Steel Foundries, Chicago, Ill., a corporation of New Jersey Application September 21, 1942, Serial No. 459,087

23 Claims. (Cl. 213—32)

My invention relates to draft gears and more particularly to a general type of gear commonly called the barrel type utilizing clutch means at the open end of the barrel and a compression spring at the closed end thereof supporting said clutch means.

The general object of my invention is to devise an improved form of clutch type draft mechanism wherein a plurality of wedge inserts or intermediate wedges operate in conjunction with friction shoes, a wedge follower, resilient means, and the housing to provide adequate capacity and positive release.

My invention comprehends in one modification an arrangement in which each wedge insert is afforded a turning moment with respect to adjacent inserts during release of the gear, said turning moment being accommodated by a ball and socket engagement by the adjacent inserts, as more fully described in my co-pending application, Serial No. 410,835, filed September 15, 1941, in the United States Patent Office, now Patent No. 2,360,566, dated October 17, 1944, and my invention comprehends in another modification thereof an arrangement in which each wedge insert acts independently of the adjacent inserts and is supported in the usual manner from a projection on the spring cap member seated on the resilient means in the housing.

Another object of my invention is to increase manufacturing tolerances for the friction shoes by providing shoe tightener means operative to maintain all of the shoes in tight engagement with the housing despite the fact that one or more of said shoes may be longer or shorter than standard.

A specific object of my invention is to design a draft gear such as above described in which the spring cap supporting the shoes from the resilient means is a two-piece structure, the outer portion thereof being resiliently mounted on the inner portion thereof, each portion supporting one of the two pairs of friction shoes utilized, and the portions of said cap being afforded a rocking movement with respect to each other. It will be understood, as hereinafter discussed, that this arrangement will afford a tight seat against the housing for each friction shoe despite the fact that one or more of these shoes may be shorter or longer than standard.

In one modification I have illustrated my invention as utilized in an oval housing in which oppositely disposed pairs of friction surfaces engage respectively a pair of relatively large and a pair of relatively small friction shoes, and in another modification I have illustrated my invention as utilized in an arrangement in which two pairs of identical shoes seat against complementary surfaces on the housing.

A further object of my invention is to provide a shoe tightener spring cap of the type above described in which the outer portion of the cap supports not only the associated friction shoes but also a pair of wedge inserts associated with the respective shoes in the manner above indicated.

My invention comprehends a novel spring cap comprising an inner portion adapted to seat on the associated resilient means and comprising on the outer surface thereof a plurality of oppositely disposed friction shoe seats about the perimeter thereof, said inner portion also supporting a plurality of resilient pads affording a support for the outer portion of the spring cap which comprises a plurality of oppositely disposed friction shoe seats on the outer surface thereof.

In my novel arrangement, the inner and outer portions of the spring cap are afforded a rocking movement with respect to each other whereby each portion may accommodate variance in sizes between the friction shoes associated therewith as well as variance in sizes between said shoes and the shoes associated with the other portion of the cap.

Figures 6 to 8 inclusive show in detail the inner portion of my novel spring cap shoe tightener, Figure 6 being a plan view taken from the outer surface thereof, Figure 7 being a view in elevation taken from the bottom as seen in Figure 6, and Figure 8 being a further elevational view taken from the right as seen in Figure 6.

Figures 9 and 10 show one of the identical resilient pads utilized in conjunction with my novel spring cap shoe tightener, Figure 9 being a plan view taken from the inner surface of said pad, and Figure 10 being a view in elevation taken from the bottom as seen in Figure 9.

Figures 11 to 13 show in detail the cross-piece or outer portion of my novel spring cap shoe tightener, Figure 11 being a plan view taken from the outer face thereof, Figure 12 being a side view thereof, and Figure 13 being an end view taken from the right as seen in Figure 11.

Figure 16:
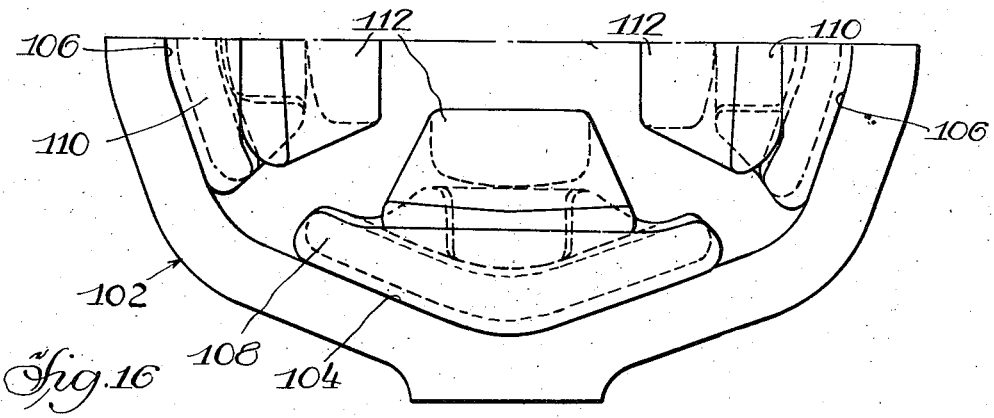
Figure 17:
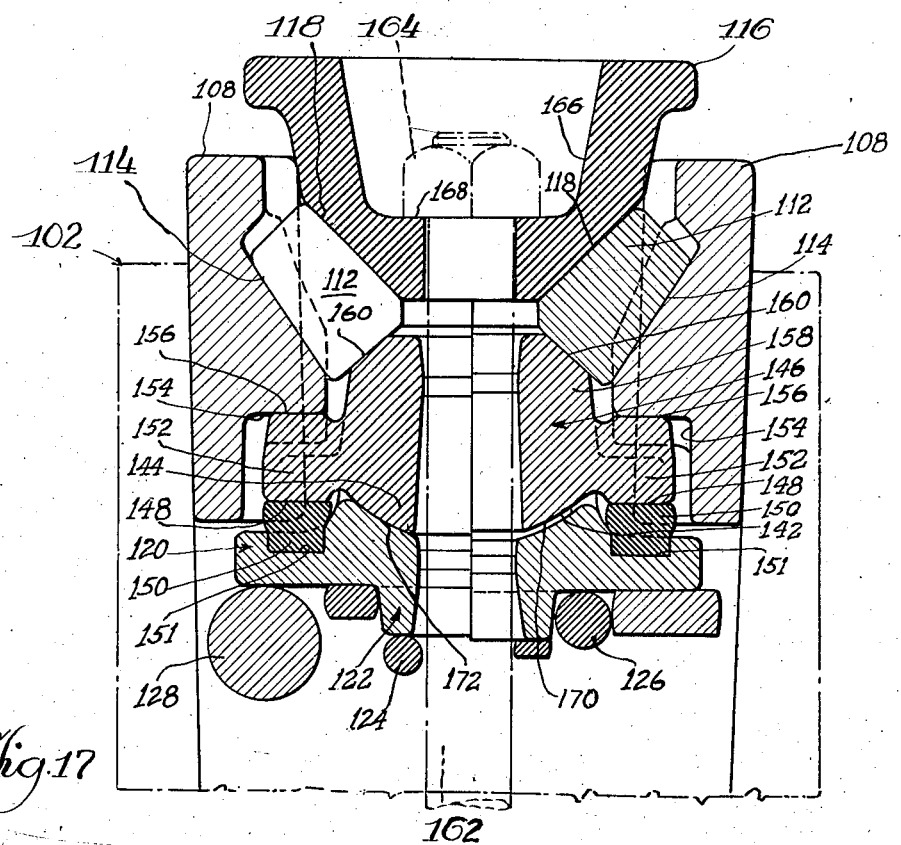

Figures 14 to 17 inclusive show a modification of my invention, Figure 14 being a view showing the clutch mechanism in elevation with the friction housing and the compression springs being shown in section and the large shoes being omitted, Figure 15 being a plan view from the open end of the friction housing with the assembled spring cap shoe tightener positioned therein, Figure 16 being a plan view of the friction shoes and wedge inserts in assembled relationship within the friction housing, and Figure 17 being a sectional view taken approximately in the plane indicated by the line 17—17 of Figure 14, the left half of Figure 17 showing a condition in which the inner portion of the spring cap is moved outwardly to tighten the associated shoes, and the right half of Figure 17 showing a condition in which the outer half of said spring cap is moved outwardly to tighten the associated shoes.

Figure 1:
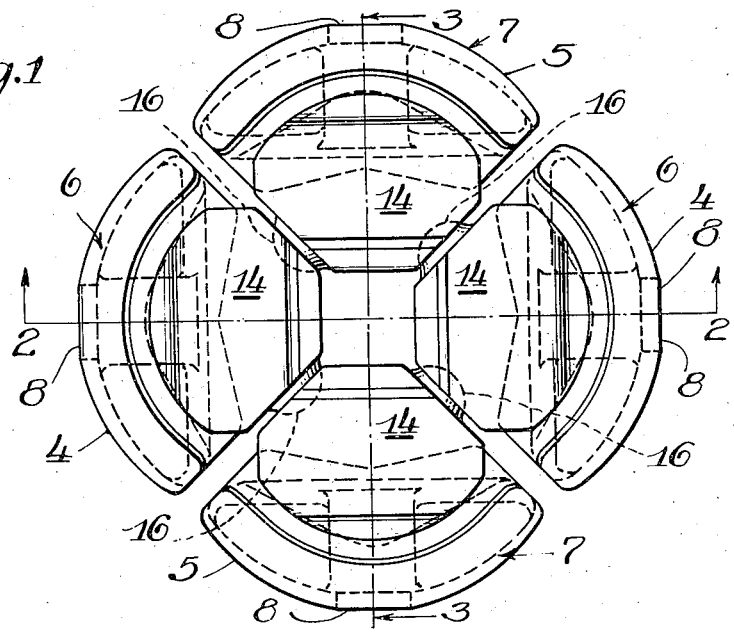
Fig. 1 is a plan view of the friction shoes and wedge inserts utilized in one modification of my invention and shown in assembled relationship, the outer wedge and the friction housing being omitted.

Describing my invention in detail and referring first to the modification illustrated in Figures 1 to 13 inclusive, the barrel type housing fragmentarily indicated at 2 is of usual form and comprises oppositely disposed pairs of internal arcuate tapering friction surfaces against which the friction faces 4, 4 and 5, 5 of respective pairs of oppositely disposed friction shoes 6, 6 and 7, 7 may seat in the usual manner, each of said faces being interrupted at 8 (Figures 1 and 2) by a flat portion in order to facilitate engagement of said face with the associated surface on the housing, as will be clearly understood by those skilled in the art.

Figure 2:
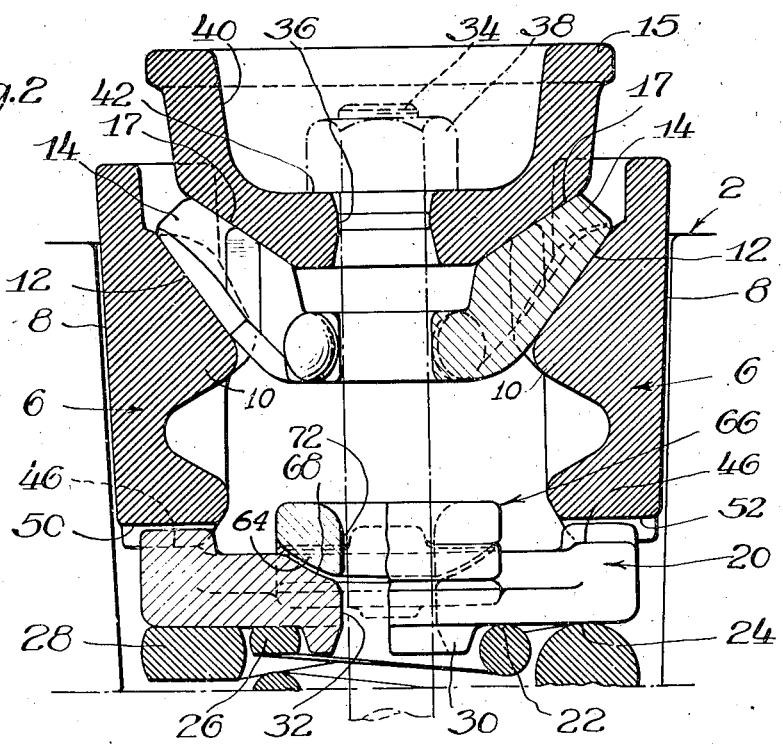
Figure 2 is a sectional view of my novel draft gear substantially in the plane indicated by the line 2—2 of Figure 1, the housing being fragmentarily indicated and the wedge insert in the left half of the figure being shown in elevation.
Figure 3:
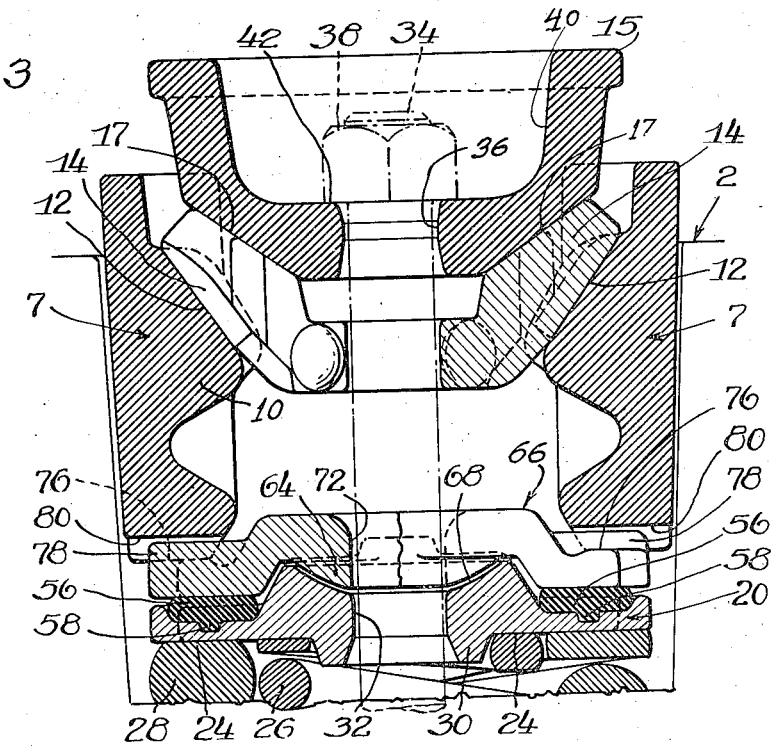
Figure 3 is a further sectional view in substantially the plane indicated by the line 3—3 of Figure 1, the wedge insert at the left half of said figure and the right half of the outer portion of the spring cap being shown in elevation.

Each of the friction shoes 6, 6 and 7, 7 comprises a ledge portion 10 in diagonal V-shaped face engagement as at 12 with the associated wedge insert 14 as best seen in Figures 2 and 3, one of said wedge inserts being associated with each shoe and being afforded a ball and socket engagement at 16 (Figure 1) with adjacent wedge inserts as more fully described in my said co-pending application, Serial No. 410,835. An outer follower wedge 15 (Figures 2 and 3) engages the insert members 14, 14 at 17, 17 along complementary diagonal surfaces.

The friction shoes are supported by my novel two-piece spring cap shoe tightener in a manner hereinafter more fully described. The inner portion 20 of said cap is substantially round in plan view and is shown in detail in Figures 6 to 8 inclusive, said inner portion being seated as at 22 and 24 (Figures 2 and 3) on respective inner and outer compression springs 26 and 28, the opposite ends of said springs being supported in usual manner from the end of the housing 2, and said inner portion 20 of the shoe tightener spring cap comprises on the inner face thereof the annular spring positioning flange 30 partially defining the opening 32 accommodating the securing bolt 34, said bolt being of usual form and projecting between the friction shoes and the wedge inserts and through an opening 36 in the outer wedge follower 15 for engagement with a securing nut 38 received within a recess 40 in said follower and seated thereagainst at 42.

Figure 4:
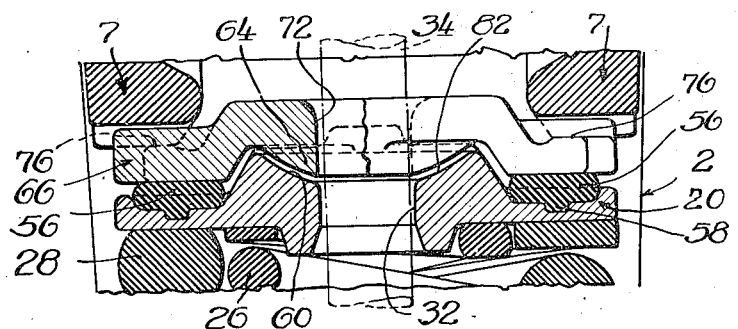
Figures 4 and 5 are fragmentary sectional views corresponding to Figure 3 but showing my novel spring cap shoe tightener utilized in conjunction with friction shoes of varying lengths.
Figure 5:
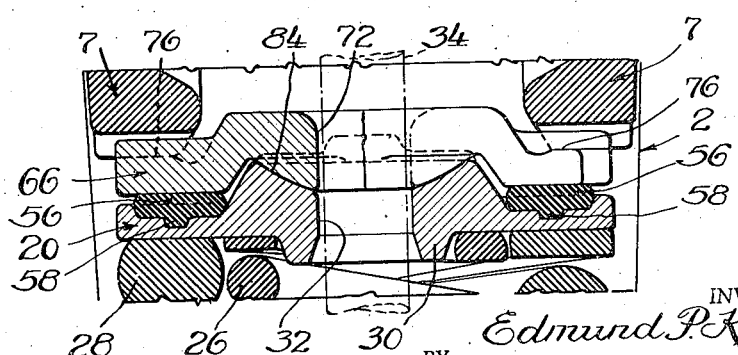

The inner portion 20 of the spring cap comprises on the outer face thereof a pair of diametrically opposed seats 44, 44 adjacent the perimeter thereof and formed and arranged for engagement as at 46, 46 with the pair of shoes 6, 6 (Figure 2), each of said seats 44, 44 being interrupted by a lug 48 received within a complementary recess 50 (Figure 2) on the associated shoe 6 whereby the shoes 6, 6 and the inner portion 20 of the shoe tightener spring cap are interlocked. The inner portion of the spring cap also comprises on the outer face thereof and intermediate the seats 44, 44 diametrically opposed recesses 54, 54, each of said recesses being formed and arranged for the reception of an associated resilient pad 56, said pad comprising a positioning projection or lug 58 formed and arranged for reception within a complementary recess in the member 20, as best seen in Figures 3 to 5. Centrally and on the outer surface thereof the member 20 comprises a substantially concave recess 60 interrupted by the opening 62 extending through said member and formed and arranged for reception of the securing bolt 34, said concave recess 60 being adapted for reception of a complementary convex projection 64 on the outer portion or cross-piece 66 of my novel shoe tightener spring cap, the projection 64 being afforded normal clearance at 68 (Figures 2 and 3) from the concave surface 60.

The cross-piece 66 is shown in detail in Figures 11 to 13 inclusive and is substantially rectangular in plan view with the arcuate ends 70, 70 conforming to the contour of the periphery of the inner portion 20 of the spring cap shoe tightener. Centrally thereof the cross-piece 66 is provided with an opening 72 therethrough, said opening being formed and arranged for the reception of the securing bolt 34, and on the outer surface of the cross-piece adjacent opposite ends thereof are the spaced seats 74, 74 adapted for engagement at 76, 76 with the inner ends of the associated friction shoes 7, 7, each of the seats 74, 74 being interrupted by a lug 78 formed and arranged for reception within a complementary recess 80 (Figure 3) in the inner end of the associated shoe 7 whereby the cross-piece 66 and the pair of friction shoes 7, 7 are interlocked. On the inner face thereof, the cross-piece or outer portion of my novel spring cap shoe tightener is provided with the before-mentioned convex projection 64 adapted for reception within the complementary concave recess on the outer face of the inner portion 20 of the spring cap and serving a purpose hereinafter more fully described.

Figure 4 is a fragmentary sectional view taken in the same plane as that of Figure 3 but showing a condition in which the shoes 7, 7 are relatively short or the shoes 6, 6 are relatively long, in which case the cross-piece or outer portion 66 of the spring cap shoe tightener is moved outwardly by means of the resilient pads 56, 56 to tighten the shoes 7, 7 against the associated friction surfaces. Under these conditions the clearance between the projection 64 on the cross-piece and the recess 60 on the outer surface of the inner portion 20 of the spring cap is increased as indicated at 82 (Figure 4).

Figure 5 is a fragmentary sectional view taken in the same plane as that of Figure 3 and Figure 4 but showing a condition in which the shoes 6, 6 are relatively short or the shoes 7, 7 are relatively long, in which case the member 20 is moved outwardly to further compress the resilient pads 56, 56 and to substantially eliminate clearance as at 84 between the cross-piece and the inner portion 20 of the shoe tightener.

Thus it will be clearly understood by those skilled in the art that my novel spring cap shoe tightener is effective to maintain both pairs of the friction shoes 6, 6 and 7, 7 in tight engagement with the associated friction surface of the housing despite variances in the lengths of the shoes 6, 6 and 7, 7 and it will be further understood that under the conditions shown in any one of Figures 3 to 5 inclusive, either the inner or the outer portion of the spring cap may be permitted a tilting or rocking movement with respect to the other portion thereof in order to accommodate variance between the lengths of the shoes 6, 6 or 7, 7, associated therewith, said tilting movement being accommodated by the nature of the engagement between the convex projection 64 on the outer portion of the shoe cap and the concave recess 60 on the inner portion 20 thereof. As will be clearly apparent to those skilled in the art the projection 64 and the recess 60 function somewhat as a ball and socket joint to accommodate at all times tilting of either of the members 20 or 66 without causing a tilting of the other of said members. Thus, each of said members may tilt independently of the other to accommodate inequalities of length in the shoes associated therewith.

A different modification of my invention is shown in Figures 14 to 17 wherein the housing 102 comprises pairs of oppositely disposed internal tapering friction surfaces 104, 104 and 106, 106 against which may be seated respectively a pair of relatively large friction shoes 108, 108 and a pair of relatively small friction shoes 110, 110. A plurality of wedge inserts 112, 112 are disposed in diagonal V-shaped face engagement at 114, 114 with the respective friction shoes 108, 108 and 110, 110, each of said inserts being engaged with one of said shoes, and an outer follower wedge 116 engages the inserts 112, 112 at 118.

In this modification, the inner portion 120 of my novel spring cap shoe tightener comprises the inwardly directed annular flange 122, seated on the compression spring 124, and said flange is received within the compression spring 126 upon which the inner portion 120 of the spring cap is also supported, said inner portion 120 being further supported on the compression spring 128 sleeved over the springs 124 and 126. The member 120 comprises the elevated end portions 130, 130 each comprising a tongue 132 received within the recess 134 in the associated friction shoe 110 for interlocking engagement therewith and affording a seat at 136 therefor, said end portion also comprising the elevated lug 138 comprising a diagonal surface 140 formed and arranged for engagement with the associated wedge insert 112. On the outer surface thereof the member 120 comprises the concave recess 142 adapted for the reception of a complementary convex projection 144 on the inner face of the cross-piece or outer portion 146 of my novel spring cap shoe tightener, said cross-piece extending between the end portions 130, 130 of the member 120 and being seated at 148, 148 on the spaced resilient pads 150, 150 recessed as at 151, 151 respectively in opposite sides of the outer surface of the member 120.

The cross-piece 146 also comprises the spaced tongues 152, 152 received within the recesses 154, 154 in the respective large shoes 108, 108 and affording a seat therefor as at 156, 156 respectively, and intermediate the tongues 152, 152 the cross-piece 146 is provided with an outwardly extending lug or projection 158 comprising diagonal surfaces 160, 160 at opposite sides thereof, said surfaces 160, 160 being in complementary engagement with the inserts 112, 112 associated with the relatively large shoes 108, 108.

A retaining bolt 162 extends through the springs 124, 126, and 128 and through aligned openings in the inner and outer portions 120 and 146 of the spring cap and through an opening in the outer follower wedge 116 for engagement with a nut 164 received within a recess 166 in said follower wedge and seated thereagainst at 168.

From a consideration of Figure 17 it will be apparent that when the large shoes 108, 108 are relatively short or the small shoes 110, 110 are relatively long, the outer portion or cross-piece 146 of the spring cap shoe tightener is urged outwardly by the resilient pads 150, 150 to tighten the large shoes 108, 108 against the associated friction surfaces 104, 104 on the housing and thus increasing the clearance between the convex projection 144 on the cross-piece 146 and the concave recess 142 on the inner portion of the spring cap, as indicated at 170 in the right half of Figure 17, and it will be further apparent that in a condition where the large shoes are relatively long or the small shoes are relatively short the inner portion 120 of the spring cap is moved outwardly to tighten the associated small shoes 110, 110 and to substantially eliminate the clearance between the inner and outer portions of the spring cap shoe tightener as indicated at 172 in the left half of Figure 17.

It will also be understood as in the previous modification, that in the event that either of the shoes 108, 108 is relatively short with respect to the other, the cross-piece 146 will be afforded a tilting or rocking movement with respect to the inner portion of the spring cap to maintain both of the shoes 108, 108 in tight engagement with the associated friction surfaces 104, 104 and likewise, in the event that either of the friction shoes 110, 110 is relatively short with respect to the other, the inner portion 120 of the spring cap shoe tightener will be permitted a tilting or rocking movement with respect to the cross-piece 146 to maintain both of the shoes 110, 110 in tight engagement with the associated friction surfaces 106, 106 on the housing. The tilting or rocking movement of either portion of the spring cap with respect to the other is facilitated by means of the convex contour of the projection 144 on the cross-piece and the concave recess 142 on the inner portion of the spring cap, as will be clearly apparent to those skilled in the art.

In each of the modifications shown herein it will be understood that the engagement of the convex projection on the outer portion of the spring cap with the concave recess in the inner portion of said spring cap serves to prevent overcompression of the resilient pads positioned between said portions.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a draft gear, a housing comprising an internal friction surface, friction shoes in engagement therewith, a compression spring in said housing, a spring cap member on said spring and comprising oppositely spaced seats adjacent the perimeter thereof engaged with certain of said shoes, oppositely spaced resilient means adjacent the perimeter of said member and supported thereon between said seats, a shoe tightener member supported on said resilient means and comprising at opposite ends thereof seats engaged with other of said shoes, and outer wedge means engaged with all of said shoes, said shoe tightener member comprising centrally thereof a convex inwardly directed projection received within a concave recess in the first-mentioned member to limit compression of said resilient means, said projection and recess being formed and arranged to permit at all times a tilting action of either of said members independently of the other to accommodate inequalities in the length of the shoes associated therewith.

2. In a draft gear, a housing comprising an internal friction surface, two pairs of oppositely disposed shoes seated thereagainst, outer wedge means in engagement with said shoes, a compression spring in said housing, a member seated thereon and engaged with one pair of said shoes, spaced resilient pads at opposite sides of the axis of said gear and mounted on said member, another member seated on said pads and engaged with the other pair of said shoes, and convex projecting means on one of said members received within complementary recessed means on the other member, said projecting means being adapted for engagement with the last-mentioned member under certain operating conditions whereby overcompression of said resilient pads is prevented, said projecting and recessed means being formed and arranged to permit at all times a tilting position of each of said members with respect to the other thereof.

3. In a draft gear, a housing comprising an internal friction surface, friction shoes in engagement therewith, a compression spring in said housing, a spring cap member on said spring and comprising oppositely spaced seats adjacent the perimeter thereof engaged with certain of said shoes, oppositely spaced resilient means adjacent the perimeter of said member and recessed therein between said seats, a shoe tightener member supported on said resilient means and comprising at opposite ends thereof seats engaged with other of said shoes, outer wedge means engaged with all of said shoes, and abutment means on said cap member and said shoe tightener member limiting compression of said resilient means, said abutment means being so constructed as to readily accommodate at all times a tilted position of either of said members with respect to the other member without causing a tilting of said other member.

4. In a draft gear, a housing comprising an internal friction surface, two pairs of oppositely disposed friction shoes seated thereagainst, a plurality of wedge inserts engaged with respective shoes, a ball and socket engagement between adjacent inserts, an outer follower wedge in diagonal face engagement with said inserts, a compresssion spring in said housing, a member seated thereon and engaged with one pair of said shoes, spaced resilient pads at opposite sides of the axis of said gear and mounted on said member, another member seated on said pads and engaged with the other pair of said shoes, and spaced projection and recess means on the respective members centrally thereof, said spaced means having complementary arcuate surfaces formed and arranged for abutment under certain operating conditions to prevent over-compression of said pads, said surfaces being so constructed as to readily accommodate at all times a tilted position of either of said members with respect to the other.

5. In a draft gear, a housing comprising an internal friction surface, two pairs of oppositely disposed shoes seated thereagainst, wedge inserts in diagonal engagement with respective shoes, an outer follower wedge in diagonal face engagement with said inserts, a compression spring in said housing, a member seated thereon and engaged with one pair of said shoes and the associated inserts, spaced resilient means at opposite sides of the axis of said gear and mounted on said member, another member seated on said means and engaged with the other pair of said shoes and the inserts associated therewith, and complementary ball and socket means on the respective members centrally thereof, said ball and socket means being normally spaced apart but being formed and arranged for engagement under certain operating conditions to limit compression of said resilient means.

6. In a draft gear, a housing comprising an internal friction surface, friction shoes in engagement therewith, a compression spring in said housing, a spring cap member on said spring and comprising oppositely spaced seats adjacent the perimeter thereof engaged with certain of said shoes, oppositely spaced resilient means adjacent the perimeter of said member and supported thereon between said seats, a shoe tightener member supported on said resilient means and comprising at opposite ends thereof seats engaged with other of said shoes, outer wedge means engaged with all of said shoes, and complementary ball and socket means on the respective members centrally thereof, said ball and socket means being normally spaced apart but being formed and arranged for engagement under certain operating conditions to limit compression of said resilient means.

7. In a draft gear, a housing comprising an internal friction surface, a compression spring therein, friction shoes engaged with said surface, inner and outer spring cap members each engaging certain of said shoes, one of said members being seated on said spring, and resilient means associated with the other of said members and operable to urge the shoes associated therewith into tight engagement with said surface, said resilient means acting independently of said compression spring, outer wedge means engaged with said shoes, and spaced bearing means on the respective members, said spaced bearing means being formed and arranged for abutment under certain operating conditions to prevent over-compression of said resilient means, and said bearing means being so constructed as to readily accommodate at all times a tilted position of either of said members with respect to the other thereof without causing a tilting of said last-mentioned member.

8. In a draft gear, a housing comprising an internal friction surface, two pairs of oppositely disposed shoes seated thereagainst, outer wedge means in engagement with said shoes, a compression spring in said housing, a member seated thereon and engaged with one pair of said shoes, spaced resilient pads at opposite sides of the axis of said gear and mounted on said member, another member seated on said pads and engaged with the other pair of shoes, and spaced projection and recess means on the respective members centrally thereof, said spaced means having complementary spherical surfaces formed and arranged for abutment under certain operating conditions to prevent over-compression of said pads, said surfaces being so constructed as to readily accommodate at all times a tilted position of either of said members to accommodate inequalities in the length of the respective shoes associated therewith.

9. In a draft gear, a housing comprising an internal friction surface, friction shoes in engagement therewith, a compression spring in said housing, a spring cap comprising an inner member engaged with certain of said shoes, an outer member engaged with other of said shoes, and spaced resilient means at opposite sides of the axis of the gear and compressed by and between said members, outer wedge means engaged with said shoes, and complementary ball and socket means on the respective members centrally thereof, said ball and socket means being normally spaced apart but being formed and arranged for engagement under certain operating conditions to limit compresssion of said resilient means.

10. In a draft gear, a housing comprising an internal friction surface, friction shoes in engagement therewith, a compression spring in said housing, a spring cap comprising an inner member in engagement with certain of said shoes, an outer member in engagement with other of said shoes, and spaced resilient means under compression between said members, outer wedge means engaged with said shoes, and complementary ball and socket means on the respective members centrally thereof, said ball and socket means being normally spaced apart but being formed and arranged for engagement under certain operating conditions to limit compression of said resilient means.

11. In a composite spring cap for a draft gear, a portion comprising a plurality of friction shoe seats on one surface thereof, another portion comprising a plurality of friction shoe seats on a surface thereof, and spaced resilient means between said portions, said portions comprising abutment means preventing overcompression of said resilient means, said abutment means being formed and arranged to accommodate at all times a tilted position of either of said portions with respect to the other thereof without causing a tilting of said last-mentioned portion.

12. In a draft gear, a housing comprising an internal friction surface, two pairs of oppositely disposed friction shoes seated thereagainst, outer wedge means in engagement with said shoes, a compression spring in said housing, a member seated thereon and supporting one pair of said shoes, spaced resilient means recessed in said member, another member seated on said resilient means and supporting the other pair of said shoes, and spaced projection and recess means on the respective members centrally thereof, said spaced means having complementary arcuate surfaces formed and arranged for engagement under certain operating conditions to prevent over-compression of said resilient means, said surfaces being so constructed as to readily accommodate at all times a tilted position of either of said members with respect to the other member without causing tilting of said last-mentioned member.

13. In a draft gear, a housing comprising internal friction surfaces, friction shoes in engagement with respective surfaces, a compression spring in said housing, a spring cap thereon engaged with certain of said shoes, a member outwardly of said cap and engaged with other of said shoes, resilient means between said cap and said member, outer wedge means engaged with said shoes, and spaced bearing means on said cap and said member respectively, said bearing means being formed and arranged for abutment under certain operating conditions to prevent over-compression of said resilient means and said bearing means being so constructed as to readily accommodate at all times a tilted position of either said cap or said member with respect to the other without causing tilting thereof.

14. In a composite spring cap for a draft gear, a portion comprising a plurality of friction shoe seats on one surface thereof, another portion comprising a plurality of friction shoe seats on a surface thereof, and spaced resilient means between said portions, said portions comprising bearing means centrally thereof and formed and arranged to accommodate tilting movement at all times of said portions with respect to each other, said bearing means being adapted for engagement under certain operating conditions to limit compression of said resilient means.

15. In a draft gear, a housing comprising an internal friction surface, friction shoes in engagement therewith, inner and outer spring cap members each supporting certain of said shoes, resilient means compressed by and between said members, independent resilient means supporting said inner member, outer wedge means engaged with said shoes, and spaced bearing means on the respective members, said spaced bearing means being formed and arranged for abutment under certain operating conditions to prevent over-compression of said first-mentioned resilient means and said bearing means being so constructed as to readily accommodate at all times a tilted position of either of said members with respect to the other member without causing a tilting thereof.

16. In a draft gear, a housing comprising an internal friction surface, friction shoes in engagement therewith, inner and outer spring cap members supporting respective shoes, spaced resilient means compressed by and between said members at opposite sides of the axis of said gear, independent resilient means supporting said inner member, outer wedge means engaged with said shoes, and complementary ball and socket means on the respective members centrally thereof, said ball and socket means being normally spaced apart but being formed and arranged for engagement under certain operating conditions to limit compression of said first-mentioned resilient means.

17. In a draft gear, a housing comprising an internal friction surface, friction shoes in engagement therewith, inner and outer spring cap members supporting respective shoes, resilient means urging each member into engagement with its associated shoes, outer wedge means engaged with said shoes, and spaced cooperating bearing means on the respective members, said spaced bearing means being disposed centrally thereof and being formed and arranged for abutment under certain operating conditions to prevent over-compression of certain of said resilient means, and said bearing means being so constructed as to readily accommodate at all times a tilted position of either of said members with respect to the other member without causing tilting thereof.

18. In a composite spring cap for a draft gear, an inner portion comprising a plurality of friction shoe seats on one surface thereof, an outer portion comprising a plurality of friction shoe seats on one surface thereof, resilient means between said portions, and complementary ball and socket means on the respective portions centrally thereof, said ball and socket means being normally spaced apart but being formed and arranged for engagement under certain operating conditions to limit compression of said resilient means.

19. In a composite spring cap for a draft gear, a portion comprising a plurality of friction shoe seats on one surface thereof, another portion comprising a plurality of friction shoe seats on a surface thereof, spaced resilient means between said portions, and spaced cooperating bearing means on the respective portions, said spaced bearing means being formed and arranged for abutment under certain operating conditions to prevent over-compression of said resilient means and said bearing means being so constructed as to readily accommodate at all times a tilted position of either of said portions with respect to the other of said portions without tilting said last-mentioned portion.

20. In a spring cap for a draft gear, inner and outer portions each affording seats for associated friction shoes, resilient means adapted to be placed under compression between said portions, and complementary ball and socket means on the respective portions centrally thereof, said ball and socket means being normally spaced apart but being formed and arranged for abutment under certain operating conditions to limit compression of said resilient means.

21. In a draft gear, a housing having an internal friction surface, a plurality of shoes in frictional engagement therewith, spaced inner and outer members each bearing against certain of said shoes and being spaced from the other of said shoes, outer wedge means engaging said shoes, a spring in said housing bearing against the inner of said members, resilient means between said members, and a projection on one of said members centrally thereof and presenting a convex spherical abutment surface for complementary engagement under certain operating conditions with a concave spherical abutment surface on the other of said members to limit compression of said resilient means, said abutment surfaces being normally spaced apart and said abutment surfaces being formed and arranged to accommodate a tilted position of either of said members with respect to the other when said surfaces are in engagement with each other without causing a tilting of said other member.

22. In a draft gear, a housing having an internal friction surface, a plurality of shoes in frictional engagement therewith, spaced inner and outer members each bearing against certain of said shoes and being spaced from the other of said shoes, outer wedge means engaging said shoes, a spring in said housing bearing against the inner of said members, resilient means between said members, and complementary ball and socket means on the respective members centrally thereof, said ball and socket means being normally spaced apart but being formed and arranged for engagement under certain operating conditions to limit compression of said resilient means.

23. In a draft gear, a housing having an internal friction surface, a plurality of shoes in frictional engagement therewith, spaced inner and outer members each bearing against certain of said shoes and being spaced from the other of said shoes, outer wedge means engaging said shoes, a spring in said housing bearing against the inner of said members, resilient means between said members, and spaced cooperating bearing means on the respective members, said bearing means being formed and arranged for abutment under certain operating conditions to prevent over-compression of said resilient means and said bearing means being so constructed as to readily accommodate at all times a tilted position of either of said members with respect to the other member without causing a tilting of said other member.

EDMUND P. KINNE.